(12) United States Patent
Wolf et al.

(10) Patent No.: US 9,993,937 B2
(45) Date of Patent: Jun. 12, 2018

(54) POWER TOOL

(71) Applicant: Andreas Stihl AG & Co. KG, Waiblingen (DE)

(72) Inventors: Günter Wolf, Oppenweiler (DE); Friedrich Hollmeier, Rudersberg (DE); Jörg Bläsi, Ebersbach (DE); Thomas Techow, Wernau (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 181 days.

(21) Appl. No.: 15/011,575

(22) Filed: Jan. 31, 2016

(65) Prior Publication Data

US 2016/0221208 A1    Aug. 4, 2016

(30) Foreign Application Priority Data

Feb. 3, 2015    (EP) .................................... 15000308

(51) Int. Cl.
| | |
|---|---|
| *B27B 17/02* | (2006.01) |
| *B23D 57/02* | (2006.01) |
| *B25F 5/02* | (2006.01) |
| *B27B 17/00* | (2006.01) |

(52) U.S. Cl.
CPC ............ *B27B 17/02* (2013.01); *B23D 57/023* (2013.01); *B25F 5/02* (2013.01); *B27B 17/00* (2013.01)

(58) Field of Classification Search
CPC ......... B23D 57/023; B25F 5/02; B27B 17/00; B27B 17/02
See application file for complete search history.

(56) References Cited

U.S. PATENT DOCUMENTS

| | | | |
|---|---|---|---|
| 5,353,506 A * | 10/1994 | Muller | B27B 17/02 |
| | | | 30/383 |
| 5,565,719 A | 10/1996 | Kuhlmann | |
| 8,132,484 B2 | 3/2012 | Pfleiderer et al. | |
| 8,615,890 B2 * | 12/2013 | Wolf | B27B 17/02 |
| | | | 30/383 |
| 9,573,208 B2 * | 2/2017 | Takayanagi | B23D 57/023 |

(Continued)

FOREIGN PATENT DOCUMENTS

| | | |
|---|---|---|
| EP | 0 822 036 | 8/1998 |
| EP | 1 602 454 | 12/2005 |
| EP | 3 053 717 A1 * | 8/2016 |

(Continued)

*Primary Examiner* — Hwei C Payer
(74) *Attorney, Agent, or Firm* — Gudrun E. Huckett (57) ABSTRACT

A power tool has a tool unit arranged between housing and housing cover. A stud bolt secured on the housing projects through a cover opening to the exterior. A support sleeve of the housing cover is provided with the cover opening and with a support surface for a fastening element screwed onto the stud bolt to secure the housing cover on the housing. The fastening element has a first section arranged at the cover exterior and delimited by a circumferential contour with flats. A maximum radial distance of the outer circumference of the support sleeve relative to the longitudinal center axis of the stud bolt at the support surface and at an adjoining first section of the support sleeve is at most as large as half the width across flats of the fastening element; a tool engaging the flats thus fits across the first section of the support sleeve.

14 Claims, 5 Drawing Sheets

(56) References Cited

U.S. PATENT DOCUMENTS

2015/0152901 A1* 6/2015 Stieler .................. B25F 5/02
 411/367
2016/0221208 A1* 8/2016 Wolf .................. B27B 17/00

FOREIGN PATENT DOCUMENTS

| GB | 2 462 938 | 3/2010 |
|----|-----------|--------|
| WO | 2004/078434 | 9/2004 |

* cited by examiner

POWER TOOL

BACKGROUND OF THE INVENTION

The invention relates to a hand-guided power tool comprising a housing on which a housing cover is secured, wherein between the housing and the housing cover a tool unit is held. On the housing, at least one stud bolt is secured that projects through a housing cover opening and comprises a longitudinal center axis, wherein onto the free end of the stud bolt a fastening element is screwed that secures the housing cover on the housing. The housing cover comprises a housing cover exterior side facing away from the housing. The fastening element comprises at least two flats that are correlated with each other and are arranged on the housing cover exterior side. The housing cover comprises a support sleeve projecting outwardly away from the housing cover exterior side and forming a support surface for the fastening element. The housing cover opening is extending through the support sleeve. The section of the fastening element that is arranged at the housing cover exterior side is delimited by a circumferential contour when viewed in a plan view in the direction of the longitudinal center axis of the stud bolt.

U.S. Pat. No. 8,132,484 B2 discloses a hand-guided power tool, i.e., a hand-guided chainsaw, whose chain sprocket cover is secured by means of captively secured nuts on the housing. The surface of the chain sprocket cover in the area of the nuts is of a flat design and the nuts are designed as collar nuts. In this way, a large support surface of the nut on the chain sprocket cover results. As a result of the height of the flats and of the collar, the exterior side of the collar nut is positioned comparatively far away from the support surface of the nut on the chain sprocket cover; this results in a large overall width of the nut.

The invention has the object to provide a hand-guided power tool of the aforementioned kind in which a reliable tightening and loosening action of the fastening elements is possible even for minimal extension of the flats of the fastening element.

SUMMARY OF THE INVENTION

In accordance with the present invention, this is achieved in that the hand-guided power tool comprises a fastening element with circumferential contour provided with the flats, wherein the maximum radial distance of the outer circumference of the support sleeve relative to the longitudinal center axis of the stud bolt at the support surface and at a first section that is adjoining the support surface is at most as large as half of the measured width across flats of the flats of the fastening element so that a tool that engages the flats can be pushed across the first section of the support sleeve.

A tool for tightening and loosening the fastening element can be pushed across the first section of the support sleeve. In this way, it is prevented that the tool can slide off the flats of the fastening element, even when the flats are comparatively short in the direction of the longitudinal center axis of the stud bolt. For a comparatively low-height configuration of the flats, the length extension of the power tool in the direction of the longitudinal center axis of the stud bolt, in case of a chainsaw in particular the overall width of the chainsaw, can be reduced. When the power tool is a chainsaw, the lateral spacing measured between the saw chain and the housing cover exterior side or the exterior side of the fastening elements can be reduced so that it is possible to perform a cut with the chainsaw closer to an obstacle. The term "radial" refers in this context to the radial direction relative of the longitudinal center axis of the stud bolt. The circumferential contour is formed, viewed in plan view in the direction of the longitudinal center axis of the stud bolt, by the areas which have the greatest distance relative to the longitudinal center axis of the stud bolt, the distance being measured in the radial direction relative to the longitudinal center axis. The circumferential contour viewed in plan view is the radial outermost circumference of the section of the fastening element. Accordingly, no area of the fastening element is arranged radially outside of the flats. In radial direction, no area of the fastening element projects past the flats. Due to this configuration, a tool which engages the flats of the fastening element can be pushed across the first section of the support sleeve.

The section of the fastening element which is arranged on the housing cover exterior side is advantageously delimited, viewed in plan view in the direction of the longitudinal center axis of the stud bolt, by a circumferential contour that comprises the flats and the support sleeve is positioned at least at the support surface and in the first section adjoining the support surface, viewed in plan view in the direction of the longitudinal center axis of the stud bolt, is located within the surface which is enclosed by the circumferential contour. Accordingly, a tool that engages the flats can be pushed across the first section of the support sleeve. Accordingly, it can be prevented that the tool slides off the flats even in case of a minimal height of the flats. The height of the flats is measured in this context parallel to the longitudinal center axis of the stud bolt. Advantageously, the flats are formed on a hexagon head of the fastening element. The section of the fastening element which is arranged on the housing cover exterior side, viewed in plan view in the direction of the longitudinal center axis of the stud bolt, is delimited by the hexagon head and the support sleeve is positioned, at least with the support surface and the first section adjoining the support surface, viewed in plan view in the direction of the longitudinal center axis of the stud bolt, within the hexagon contour of the hexagon head.

Advantageously, the height of the first section of the support sleeve which is adjoining the support surface is at least 2 mm. The height of the first section of the support sleeve which is adjoining the support surface is advantageously at least 3 mm, preferably at least 4 mm. Accordingly, the tool can be pushed 2 mm, in particular 3 mm, preferably at least 4 mm, across the support sleeve. It is thereby reliably prevented that the tool slides off the flats. The flats can thus be embodied to have a comparatively low height. The height of the flats measured parallel to the longitudinal center axis of the stud bolt is advantageously less than 10 mm, in particular less than 8 mm. Preferably, the height of the flats measured parallel to the longitudinal center axis of the stud bolt is 4 mm to 6 mm. In this way, a very minimal overall width of the housing cover and of the fastening element arranged thereat can be achieved.

The housing cover is in particular made of metal and the support surface formed on the support sleeve is machined by cutting. In this way, sufficiently high contact forces between the fastening element and the support surface can be achieved even though the contact surface area is reduced as a result of the reduced maximum radial distance of the outer circumference of the support sleeve relative to the longitudinal center axis of the stud bolt. The housing cover comprises advantageously an outer layer on the metal. The outer layer can be, for example, a layer of paint or a coating or the like. Advantageously, the outer layer does not extend onto the support surface. Preferably, the support surface is machined by cutting after the application of the outer layer so that a defined flat support surface results. The flats adjoin advantageously an end face of the fastening element that is resting on the support surface. The flats extend therefore all the way to the support surface so that an axial extension of the flats as large as possible is provided.

Advantageously, the fastening element is secured captively in the housing cover opening of the housing cover. Even when the fastening element is unscrewed completely from the stud bolt, the fastening element thus cannot be removed from the housing cover but is held on the housing cover. Advantageously, the fastening element comprises a securing rim which is projecting into the housing cover opening and which engages behind a rim of the housing cover opening. The securing rim secures the fastening element on the housing cover even when the fastening element is completely unscrewed from the stud bolt. The rim of the housing cover opening is advantageously formed in the support sleeve. As a result of the captive securing action of the fastening element on the housing cover by means of a securing rim that engages behind a rim of the housing cover, a comparatively large overall width of the housing cover in this area is required in order to enable the axial relative movement of the fastening element relative to the housing cover upon fastening and loosening of the fastening element. At the same time, a sufficiently large push-on length for a tool for rotating the fastening element is required. As a result of the first section of the support sleeve across which the tool for loosening or tightening the fastening element can be pushed, the overall width of the housing cover can be reduced because the height of the first section measured in axial direction is used as axial length for the captive securing action of the fastening element and also as push-on length for a tool. The axial length is in this context the length which is measured in the direction of the longitudinal center axis of the stud bolt.

Preferably, the rim of the housing cover opening is arranged in a second section of the support sleeve whose outer diameter is greater than the width across flats of the flats of the fastening element. In this way, a satisfactorily large outer diameter for the rim of the housing cover opening can be achieved. In order to reduce the overall width of the housing cover, it can however be provided also that the rim of the housing cover opening is arranged in the first section of the support sleeve which is adjoining the support sleeve. The securing rim is advantageously provided on a sleeve-shaped section of the fastening element which is projecting into the housing cover opening. In order to provide for a simple removal of the housing cover, the spacing measured between the securing rim and the rim of the housing cover opening when the tool unit is clamped, the thread length of the fastening element, and the thread length of the stud bolt are advantageously matched relative to each other such that the fastening element, when the tool unit is clamped between housing and housing cover, can be unscrewed completely from the thread of the stud bolt. For complete detachment of the fastening element, the housing cover therefore must not change its position. In particular in case of an attachment of the housing cover by means of two fastening elements, one fastening element can be completely detached in this way before the second fastening element is loosened. This provides for simple manipulation.

Preferably, the housing cover is a chain sprocket cover and the tool unit comprises a guide bar which is clamped between the chain sprocket cover and the housing. The tool unit however can also be a different kind of tool, in particular a grinding wheel.

DESCRIPTION OF PREFERRED EMBODIMENTS

Figure 1:
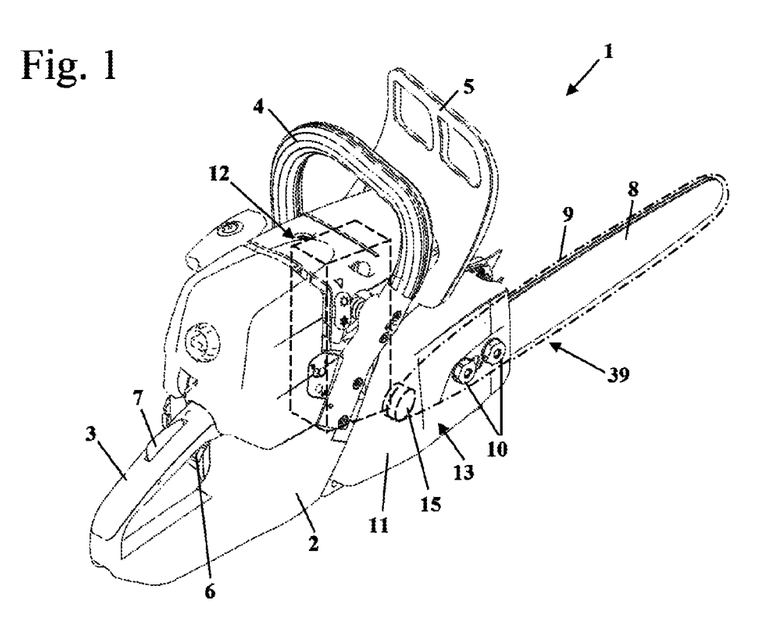
FIG. 1 is a perspective illustration of a chainsaw.

FIG. 1 shows an embodiment of a power tool in the form of a hand-guided chainsaw 1. The chainsaw 1 comprises a housing 2 on which a rear handle 3 as well as a front handle 4 are secured for guiding the chainsaw 1 in operation. On the rear handle 3, an operating lever 6 as well as an operating lever lock 7 are pivotably supported. On the housing 2, a tool unit 39 is secured which comprises a guide bar 8 and a saw chain 9 arranged to circulate about the guide bar 8. It is possible to provide another type of tool unit 39 on the power tool. On the housing 2, a hand guard 5 is arranged which in the embodiment is pivotably supported on the housing 2 and serves for actuating a chain brake device, not illustrated.

In the housing 2, a drive motor 12 is arranged which is advantageously embodied as an internal combustion engine. The drive motor 12 can however also be an electric motor that is supplied with energy by power cord or battery. The housing 2 is the motor housing of the chainsaw 1. The drive motor 12 drives a chain sprocket 15 in rotation that, in turn, drives the saw chain 9. The chain sprocket 15 is covered by a housing cover 11. The housing cover 11 is a chain sprocket cover. The housing cover 11 comprises a housing cover exterior side 13 which is facing away from the housing 2 and on which two nuts 10 for attachment of the housing cover 11 on the housing 2 are arranged. The guide bar 8 is secured by clamping action between the housing cover 11 and the housing 2.

Figure 2:
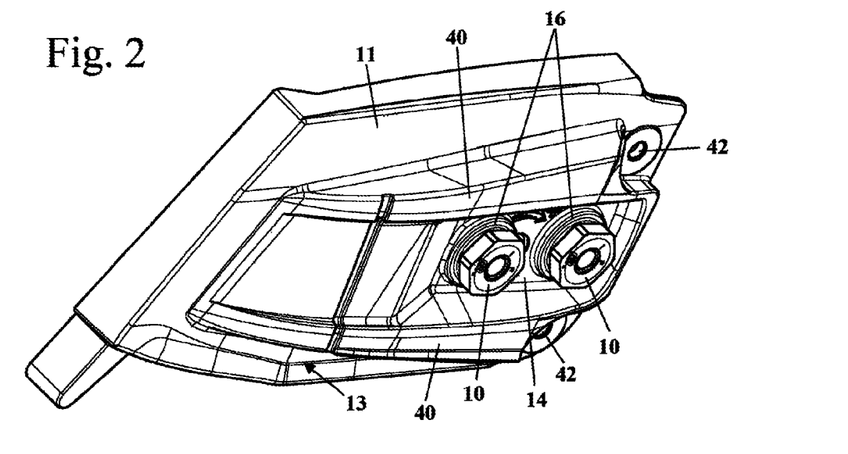
FIG. 2 is a perspective illustration of a housing cover of the chainsaw of FIG. 1 with fastening elements arranged thereat.

As shown in FIG. 2, the housing cover 11 comprises two longitudinal webs 40 at its housing cover exterior side 13; these webs 40 form a support surface for the housing cover 11 on a workpiece, for example, a tree that is to be cut. Between the two longitudinal webs 40, a recess 14 is formed on the housing cover exterior side 13 in which the nuts 10 are arranged. As shown in FIG. 2, the housing cover 11 comprises on the housing cover exterior side 13 outwardly projecting support sleeves 16 on which the nuts 10 are resting. The support sleeves 16 are arranged in the recess 14. Advantageously, the nuts 10 are mostly arranged within the recess 14, preferably completely arranged therein. Accordingly, the housing cover 11 can be guided along the longitudinal webs 40 across a workpiece without the workpiece getting caught on the nuts 10. In the embodiment, two nuts 10 are provided for attachment of the housing cover 11 on the housing 2. However, a single nut 10 can be provided instead.

As shown in FIG. 2, the housing cover 11 has fastening openings 42 for bumper spikes. The housing 2 can have further fastening openings 43 for additional bumper spikes, as shown in FIG. 4.

Figure 3:
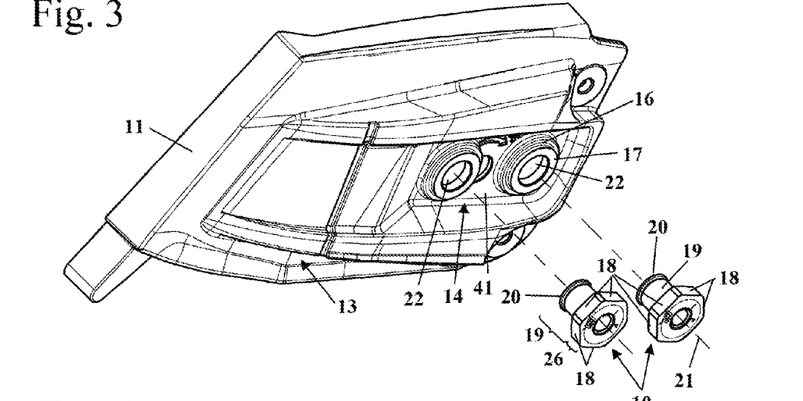
FIG. 3 is an exploded view of housing cover and fastening elements.

As shown in FIG. 3, the support sleeves 16 each surround a housing cover opening 22. The recess 14 of the housing cover 11 comprises a bottom 41 and the support sleeves 16 are projecting away from the bottom 41. The nuts 10 each comprise a first section 26 which is arranged on the housing cover exterior side 13. This first section 26 comprises flats 18 on its outer circumference. In the embodiment, the outer circumference of the first section 26 is designed as a hexagon head. Any other suitable contour of a regular or irregular shape of the exterior side of the first section 26 can however be advantageous also. The nuts 10 each comprise furthermore a second sleeve-shaped section 19 which projects into the housing cover opening 22. On the end of the second sleeve-shaped section 19 which is facing away from the first section 26, a radial outwardly projecting securing rim 20 is provided on the sleeve-shaped section 19. The nuts 10 each comprise a longitudinal center axis 21. On the support sleeves 16, a support surface 17 is formed which is facing the bottom side of the first section 26 of the nuts 10. In the embodiment, the support surfaces 17 are designed as a circular ring surface.

Figure 4:
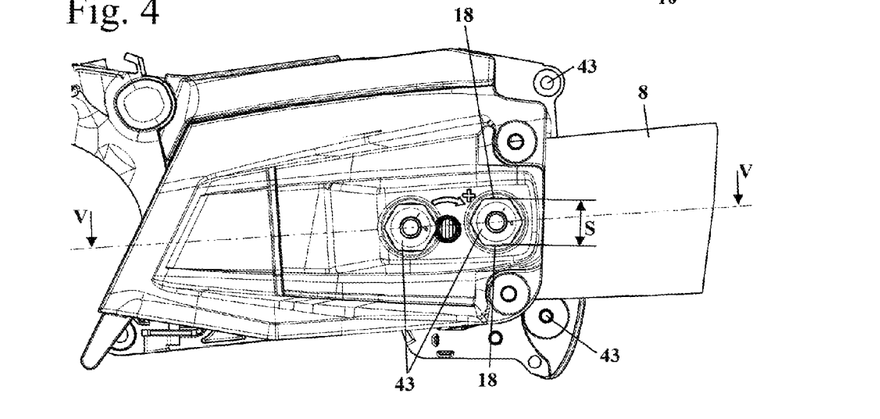
FIG. 4 is a detail side view of the chainsaw.

As shown in FIG. 4, the nuts 10 comprise a measured width across flats S which corresponds to the distance between two correlated oppositely positioned flats 18. When the nut 10 has a different shape, the measured width across flats S corresponds to twice the radius of an inner circle of the outer contour of the flats 18 wherein the center point of the inner circle is positioned on the longitudinal center axis 21 of the nut 10.

Figure 5:
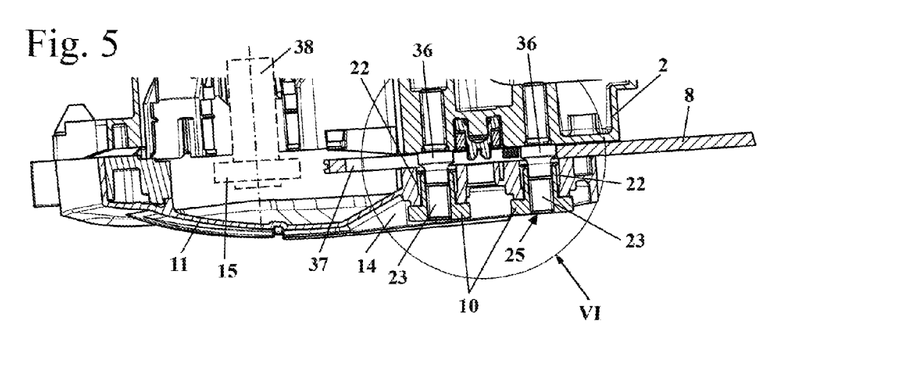
FIG. 5 is a section view along the section line V-V of FIG. 4.

As shown schematically in FIG. 5, the chain sprocket 15 is driven by a drive shaft 38. The drive shaft 38 is advantageously connected by a centrifugal clutch to a crank shaft of the internal combustion engine that forms the drive motor 12. As also shown in FIG. 5, two stud bolts 23 are screwed into the housing 2 and are each resting with a collar 36 on the exterior side of the housing 2. The outwardly projecting sections of the stud bolts 23 project through the housing cover openings 22 of the housing cover 11. The nuts 10 are screwed onto the stud bolts 23, respectively. In the embodiment, the outwardly projecting free end 25 of the stud bolts 23 is approximately flush with the exterior side of the nuts 10. As shown in FIG. 5, the nuts 10 are positioned substantially within the recess 14. The guide bar 8 comprises an opening 37 which is designed as a slotted hole and through which the stud bolts 23 are projecting.

Figure 6:
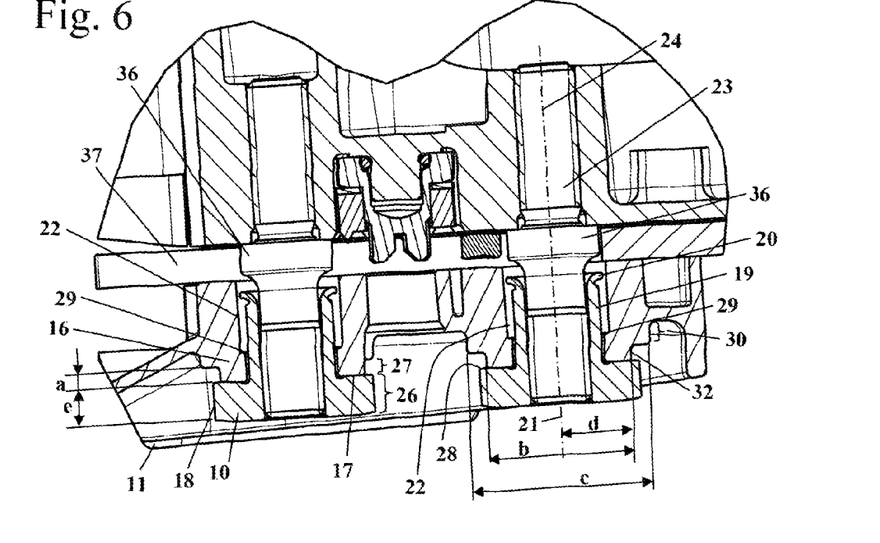
FIG. 6 is a detail view of the area VI of FIG. 5.
Figure 7:
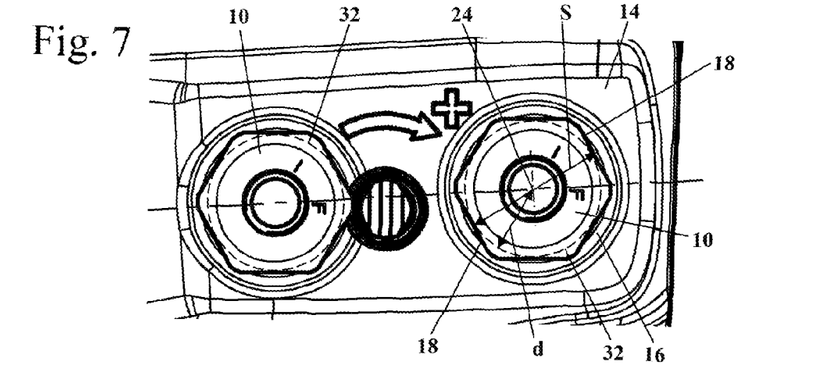
FIG. 7 is a detail plan view of the fastening elements on the housing cover.

The stud bolts 23 each comprise a longitudinal center axis 24 that, in the mounted state of the housing cover 11, coincides with the longitudinal center axis 21 of the nuts 10. FIG. 6 shows the configuration of the support sleeves 16 in detail. The support sleeves 16 have each a first section 27 that adjoins the support surface 17, respectively. The first section 27 of the support sleeves 16 has an outer diameter b. The outer diameter b corresponds in this context at most to the width across flats S of the nut 10 (FIG. 7). In the embodiment, the first sections 27 are formed with circular ring cross-section, as schematically shown in FIG. 7. For a non-regular outer contour a maximum radial distance d of the outer circumference 32 of the support sleeve 16 at the first section 27 is at most as large as, i.e., of the same size or smaller, half of the width across flats S. The nuts 10 comprise at their first outwardly positioned section 26 an end face 28 that is resting on the support surface 17 of the support sleeves 16. As also shown in FIG. 6, a second section 30 adjoins the first section 27 on the side which is facing away from the support surface 17. The second section 30 of the support sleeves 16 has an outer diameter c that is greater than the width across flats S. In this way, an increased stability is achieved.

In the plan view viewed in the direction of the longitudinal center axes 24 of the stud bolts 23, as illustrated in FIG. 7, the flats 18 form the circumferential contour of the sections 26. No area of the nuts 10 projects past the flats 18 in radial direction relative to the respective longitudinal center axis 24 and no area has a greater distance relative to the longitudinal center axis 24 in the respective direction. The first section 27 has a height a that is measured parallel to the longitudinal center axis 24 of the stud bolt 23 and amounts to at least 2 mm. Advantageously, the height a is at least 3 mm, preferably at least 4 mm. The height e of the flats 18 of the nuts 10 is advantageously less than 10 mm. The height e is advantageously less than 8 mm, preferably approximately 4 mm to approximately 6 mm.

The nuts 10 are secured captively on the housing cover 11. For this purpose, the securing rim 20 is provided. The housing cover openings 22 in the housing cover 11 each comprise a rim 29 which is engaged from behind by the radially outwardly projecting securing rim 20 when the nuts 10 are completely unscrewed from the stud bolts 23. Accordingly, the nuts 10 cannot be removed from the housing cover 11 but are secured captively on the housing cover 11 even when the housing cover 11 is removed from the housing 2.

Figure 8:
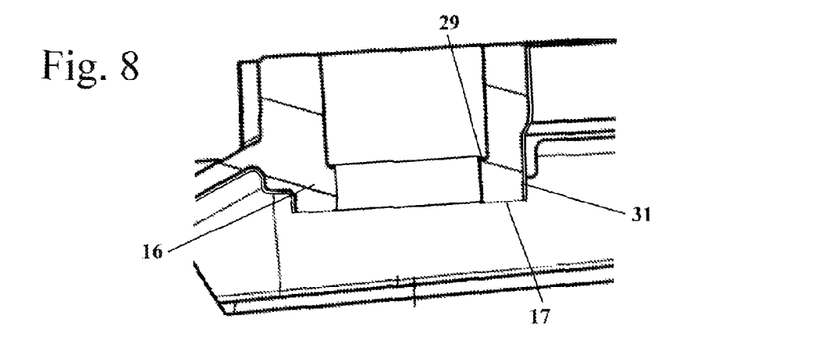
FIG. 8 is a detail section illustration of the support sleeve of the housing cover.

As shown in FIG. 8, the housing cover 11 has an outer layer 31. The outer layer 31 is advantageously a layer of paint or a coating. On the support surface 17 no outer layer 31 is provided. The support surface 17 is advantageously machined by cutting, in particular after application of the outer layer 31. Accordingly, the support surface 17 is formed as a defined flat surface. Accordingly, a defined sufficiently large contact surface area between the support surface 17 and the end face 28 of the nut 10 is achieved.

Figures 9, 10:
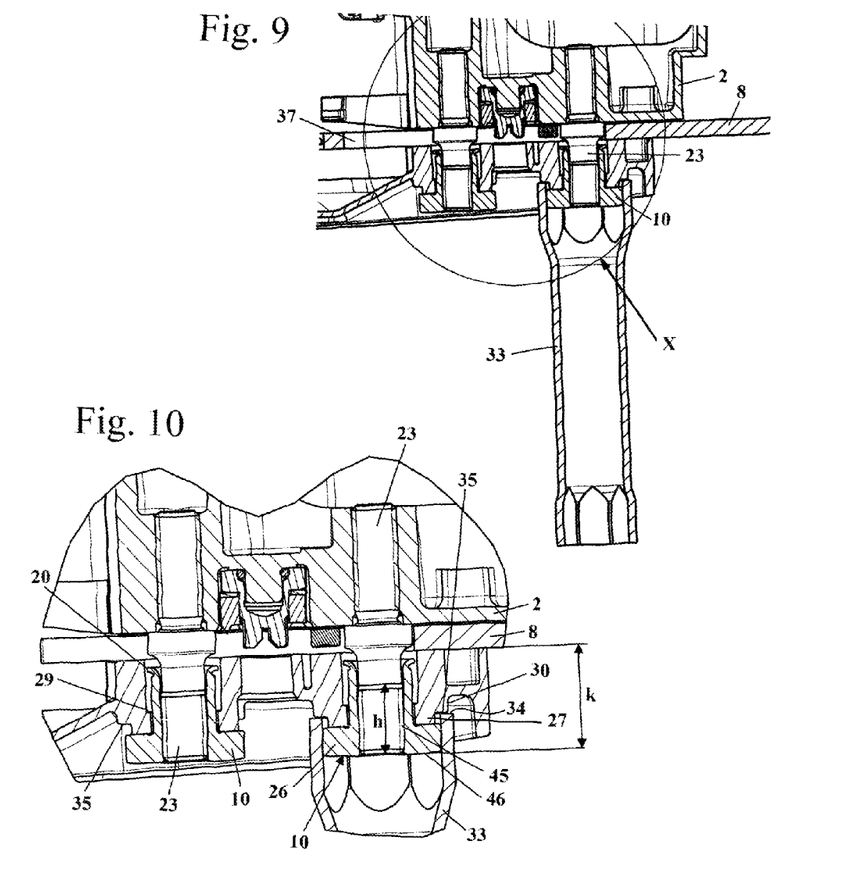
FIG. 9 is a section illustration according to FIG. 6 with a tool arranged on the fastening element.
FIG. 10 shows the detail X of FIG. 9 in an enlarged illustration.

FIGS. 9 and 10 show a tool 33 which is arranged at the assembly. In the embodiment, the tool 33 is a socket wrench. As shown in FIG. 10, in the embodiment a step 35 is formed between the sections 27 and 30 of the support sleeves 16. The tool 33 can be pushed across the exposed section 26 of the nut 10 and across the support sleeves 16 until it meets the step 35. In this way, even for a minimal height of the exposed section 26, it is ensured that the tool 33 cannot slip off the flats 18 (FIG. 7) when loosening or tightening the nut 10. The tool 33 can be resting with its end face 34 on the step 35 and can be supported thereat. The nuts 10 comprise an exterior side 46 facing away from the housing 2. Due to the first section 27 of the support sleeve 16 with reduced diameter and as a result of the reduced required height of the nuts 10, a reduced spacing k of the exterior sides 46 of the nuts 10 relative to the guide bar 8 can be achieved. The stud bolts 23 comprise an outer thread 45 that has a thread length h measured parallel to the longitudinal center axis 24 of the stud bolt 23.

Figure 11:
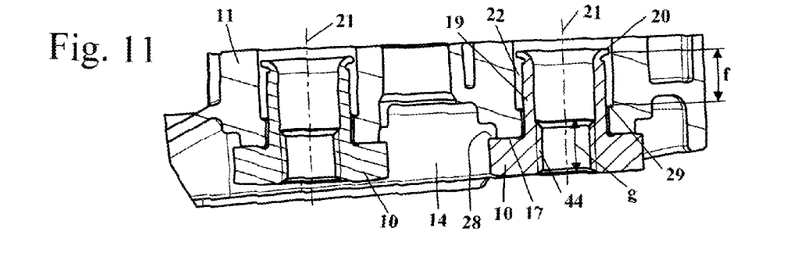
FIG. 11 is a section of the housing cover with fastening elements arranged thereat.

FIG. 11 shows the housing cover 11 with nuts 10 arranged thereat in a position in which the end faces 28 of the nuts 10 are contacting the support surfaces 17 of the support sleeves 16. In this position, the securing rim 20 at the sleeve-shaped section 19 has a spacing f relative to the rim 29 of the housing cover 11; spacing f is measured parallel to the longitudinal center axis 21 of the nut 10. The nuts 10 comprise an inner thread 44 with a thread length g. The thread length g in the embodiment is significantly smaller than a thread length h of the stud bolts 23. The thread length h of the thread 45 of the stud bolts 23, the thread length g of the inner threads 44 of the nuts 10, and the spacing f are matched to each other in such a way that the nuts 10 can be unscrewed completely from the stud bolts 23 when the housing cover 11 is contacting the guide bar 8 and the guide bar 8 is resting on the housing 2. In this way, it is possible to first completely detach one nut 10 and subsequently unscrew the other nut 10. In this context, the spacing f is at least as large as the contact length of the thread connection between the threads 44 and 45 in the tightened state of the thread connection, i.e., with the guide bar 8 being held by clamping action. In the embodiment, the contact length of the thread connection corresponds to the thread length g of the inner thread 44 of the nut 10 because the inner thread 44 in the tightened state is screwed completely onto the thread 45 of the stud bolt 23.

Figure 12:
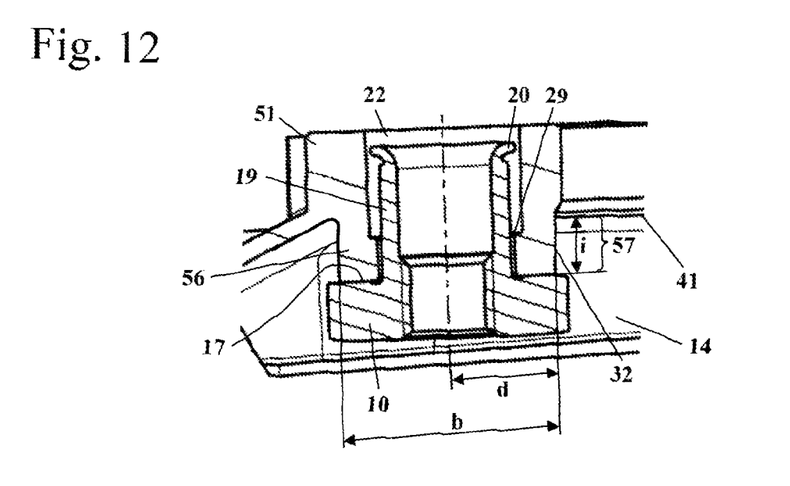
FIG. 12 is a detail section illustration of an embodiment of a housing cover.

FIG. 12 shows an embodiment of a housing cover 51 in a detail section illustration. The housing cover 51 comprises two support sleeves 56 of which one is shown in FIG. 12. The configuration of the housing cover 51 corresponds substantially to the configuration of the housing cover 2. A nut 10 is arranged on the housing cover 51. The nut 10 is embodied in accordance with the nut 10 of the preceding embodiment; same reference numerals in all Figures indicate same or corresponding elements. The sleeve-shaped section 19 of the nut 10 projects into a housing cover opening 22 of the housing cover 51. A rim 29 is formed on the housing cover opening 22 and is engaged from behind by a securing rim 20 of the sleeve-shaped section 19. The support sleeve 51 comprises a first section 57 which is adjoining the support surface 17 of the support sleeve 56 for supporting the nut 10. The first section 57 has a height i that can be greater than the height a of the first section 27 of the preceding embodiment. The height i is greater than 2 mm. The first section 57 extends down to the bottom 41 of the recess 14. Accordingly, the tool 33 can be pushed on the housing cover 51 down to the bottom 41 of the recess 14 across the nut 10. The rim 29 of the housing cover opening 22 is formed in the first section 57. The first section 57 serves thus as a section across which the tool 33 can be pushed and also provides for captive fixation of the nut 10 on the securing rim 20. The axial length of the section 57 is therefore utilized twice so that, as a whole, a minimal overall width of the housing cover 51 and a minimal spacing k (FIG. 10) between guide bar 8 and exterior side 46 of the nut 10 can be achieved.

The first section 57 has an outer diameter b that is smaller than the width across flats S of the nut 10 (FIG. 7). In the embodiment, the first section 57 has a circular ring shaped cross-section. In case of a cross-sectional shape that deviates from a circular ring shape, a maximum radial distance d of the outer circumference 32 of the first section 57 is smaller than half the width across flats S of the nut 10.

The specification incorporates by reference the entire disclosure of European priority document 15 000 308.5 having a filing date of Feb. 3, 2015.

While specific embodiments of the invention have been shown and described in detail to illustrate the inventive principles, it will be understood that the invention may be embodied otherwise without departing from such principles.

What is claimed is:

1. A hand-guided power tool comprising:
a housing;
a housing cover arranged on the housing and comprising a housing cover exterior side facing away from the housing and facing an exterior of the housing cover;
a tool unit arranged between the housing and the housing cover;
at least one stud bolt that comprises a longitudinal center axis and is secured on the housing, wherein the at least one stud bolt comprises a free end that projects through a housing cover opening to the exterior of the housing cover;
a first fastening element screwed onto the free end of the at least one stud bolt and securing the housing cover on the housing;
wherein the first fastening element comprises at least two flats that are correlated with each other and are arranged relative to the housing cover on the housing cover exterior side;
wherein the housing cover comprises a support sleeve projecting outwardly away from the housing cover exterior side;
wherein the support sleeve forms a support surface for the first fastening element, wherein the housing cover opening extends through the support sleeve;
wherein the first fastening element comprises a first section, wherein the first section of the first fastening element amounts to the entire portion of the first fastening element that is arranged at the housing cover exterior side and wherein the first section of the first fastening element is delimited by a circumferential contour when viewed in a plan view in a direction of the longitudinal center axis of the at least one stud bolt, wherein the circumferential contour is a radially outermost contour of the first section of the first fastening element when viewed in the direction of the longitudinal center axis of the at least one stud bolt;
wherein the circumferential contour of the first section of the first fastening element comprises the at least two flats;
wherein a maximum radial distance of an outer circumference of the support sleeve relative to the longitudinal center axis of the at least one stud bolt at the support surface and at a first section of the support sleeve adjoining the support surface is at most as large as half of a width across flats of the at least two flats of the first fastening element so that a tool that engages the at least two flats can be pushed across the first section of the support sleeve.

2. The power tool according to claim 1, wherein a height of the first section of the support sleeve adjoining the support surface is at least 2 mm.

3. The power tool according to claim 1, wherein a height of the at least two flats measured parallel to the longitudinal center axis of the at least one stud bolt is less than 10 mm.

4. The power tool according to claim 1, wherein the housing cover is made of metal and wherein the support surface is machined by cutting.

5. The power tool according to claim 1, wherein the at least two flats adjoin an end face of the first fastening element that is resting on the support surface.

6. The power tool according to claim 1, wherein the first fastening element is secured captively in the housing cover opening of the housing cover.

7. The power tool according to claim 6, wherein the first fastening element comprises a securing rim projecting into the housing cover opening and engaging from behind a rim of the housing cover opening.

8. The power tool according to claim 7, wherein the rim of the housing cover opening is formed within the support sleeve.

9. The power tool according to claim 8, wherein the rim of the housing cover opening is provided in a second section of the support sleeve, wherein the second section of the support sleeve has an outer diameter that is greater than the width across flats of the at least two flats.

10. The power tool according to claim 7, wherein the securing rim is formed on a second sleeve-shaped section of the first fastening element projecting into the housing cover opening.

11. The power tool according to claim 10, further comprising a second fastening element, wherein the spacing measured between the securing rim of the first fastening element and the rim of the housing cover opening, the thread length of the first fastening element, and the thread length of the at least one stud bolt are matched relative to each other such that the first fastening element, when the tool unit is clamped between the housing and the housing cover by the second fastening element, is completely removable from the thread of the at least one stud bolt.

12. The power tool according to claim 1, wherein the housing cover is a chain sprocket cover and wherein the tool unit comprises a guide bar secured by clamping action between the chain sprocket cover and the housing.

13. The power tool according to claim 1, wherein the first fastening element comprises an end face that is resting on the support surface and further comprises an exterior side facing away from the housing, wherein the first section of the first fastening element is extending from the end face to the exterior side.

14. A hand-guided power comprising:
a housing;
a housing cover arranged on the housing and comprising a housing cover exterior side facing away from the housing and facing an exterior of the housing cover;
a tool unit arranged between the housing and the housing cover;
at least one stud bolt that comprises a longitudinal center axis and is secured on the housing, wherein the at least one stud bolt comprises a free end that projects through a housing cover opening to the exterior of the housing cover;
a fastening element screwed onto the free end of the at least one stud bolt and securing the housing cover on the housing;
wherein the fastening element comprises at least two flats that are correlated with each other and are arranged relative to the housing cover on the housing cover exterior side;
wherein the housing cover comprises a support sleeve projecting outwardly away from the housing cover exterior side;
wherein the support sleeve forms a support surface for the fastening element, wherein the housing cover opening extends through the support sleeve;
wherein the fastening element comprises a first section, wherein the first section of the fastening element is arranged at the housing cover exterior side and is delimited by a circumferential contour when viewed in a plan view in a direction of the longitudinal center axis of the at least one stud bolt;
wherein the circumferential contour of the first section of the fastening element comprises the at least two flats;
wherein a maximum radial distance of an outer circumference of the support sleeve relative to the longitudinal center axis of the at least one stud bolt at the support surface and at a first section of the support sleeve adjoining the support surface is at most as large as half of a width across flats of the at least two flats of the fastening element so that a tool that engages the at least two flats can be pushed across the first section of the support sleeve;
wherein the housing cover is made of metal and wherein the support surface is machined by cutting;
wherein the housing cover comprises an outer layer applied to the metal and wherein the outer layer does not extend into the support surface.

* * * * *